US007311155B2

(12) United States Patent
Chang

(10) Patent No.: US 7,311,155 B2
(45) Date of Patent: Dec. 25, 2007

(54) PNEUMATIC TOOL WITH DIRECTION SWITCH OPERABLE WITH SINGLE HAND

(75) Inventor: Jui-Sheng Chang, Taichung Hsien (TW)

(73) Assignee: Mighty Seven International Co., Ltd., Taichung Hsien (TW)

(*) Notice: Subject to any disclaimer, the term of this patent is extended or adjusted under 35 U.S.C. 154(b) by 0 days.

(21) Appl. No.: 11/164,982

(22) Filed: Dec. 13, 2005

(65) Prior Publication Data

US 2007/0131441 A1 Jun. 14, 2007

(51) Int. Cl.
*B23B 45/04* (2006.01)

(52) U.S. Cl. ....................... 173/104; 173/109; 173/169

(58) Field of Classification Search ................ 173/104, 173/109, 169, 168, 170, 218, 221, 93.5, 93.6, 173/216
See application file for complete search history.

(56) References Cited

U.S. PATENT DOCUMENTS 3,624,820 A * 11/1971 Brown .................... 415/152.1
3,833,068 A * 9/1974 Hall ........................... 173/169
3,924,961 A * 12/1975 Hess et al. .................... 415/32
5,918,686 A * 7/1999 Izumisawa ................... 173/20
6,062,323 A * 5/2000 Pusateri et al. ............. 173/169
2002/0084086 A1* 7/2002 Taga .......................... 173/104

OTHER PUBLICATIONS

Taiwanese Patent Publication No. 387316, Apr. 11, 1989, 4 pages.
Taiwan Patent Publication M275925, Sep. 21, 1994, 8 pages.

* cited by examiner

*Primary Examiner*—Rinaldi I. Rada
*Assistant Examiner*—Nathaniel Chukwurah
(74) *Attorney, Agent, or Firm*—Alan Kamrath; Kamrath & Associates PA

(57) ABSTRACT

A pneumatic tool is operable with a single hand. The pneumatic tool includes a shell defining a first chamber and a second chamber. The second chamber includes intake and outlet apertures in communication with the first chamber. A cylinder is in the first chamber. A controller is movable in the second chamber between a first position and a second position. The controller includes a first groove and a second groove. In the first position, the first groove communicates with the intake aperture for directing pressurized air to drive the cylinder in a first direction. In the second position, the second groove communicates with the intake aperture for directing pressurized air to drive the cylinder in a second direction. A cover seals the first chamber and the second chamber. The cover defines an opening through which the controller extends from the second chamber so that the controller can be moved.

9 Claims, 7 Drawing Sheets

PNEUMATIC TOOL WITH DIRECTION SWITCH OPERABLE WITH SINGLE HAND

BACKGROUND OF INVENTION

1. Field of Invention

The present invention relates to a pneumatic tool and, more particularly, to a pneumatic tool equipped with a direction switch operable with a single hand.

2. Related Prior Art

Disclosed in Taiwanese Patent Publication No. 387316 is a pneumatic tool 1 equipped with a direction switch operable with a single hand. The pneumatic tool 1 includes a handle 11 on which an upper control member 2 and a lower control member 3 are installed. The upper control member 2 is operable to cause the pneumatic tool 1 to rotateor stop. The lower control member 3 is operable to cause the pneumatic tool 1 to rotate in a direction or in an opposite direction. A user operates the pneumatic tool 1 with a single hand. The user holds the handle 11 and the lower control member 2 with the thumb, the middle finger, the ring finger and the little finger. The user presses the lower control member 2 with the middle finger, the ring finger and the little finger in order to cause the pneumatic tool 1 to rotate. The user operates the upper control member 3 with the index finger.

However, there are problems with this conventional pneumatic tool 1. Firstly, the user soon has fatigue in the hand, pressing the lower control member 2 with the middle finger, the ring finger and the little finger while keeping the index finger off the upper control member 3. The user might get hurt in the hand if using this pneumatic tool 1 for long. Moreover, the user cannot hold the pneumatic tool 1 steady with the middle finger, the ring finger and the little finger. Furthermore, the user may unintentionally press the upper control member 3 with the index finger and change the direction of the rotation of the pneumatic tool 1, and this could be dangerous.

Disclosed in Taiwan Patent Publication M275925 is a direction switch of a pneumatic tool. A space 16 is defined in a front side of a handle 15 of a piston-shaped body 10 of the pneumatic tool. The direction switch includes a block 20 for controlling air currents. The block 20 defines upper and lower intakes 21, upper and lower outlets 22 and two apertures 23. All of the intakes 21, the outlets 22 and the apertures 23 are horizontal. The block 20 defines four channels 24 that are vertical for communicating the apertures 23 with the intakes 21 and the outlets 22. Long rods 25 are positioned in the intakes 21. Short rods 25' are positioned in the outlets 22. A user operates the pneumatic tool with a single hand. The user holds the handle 15 with the thumb, the ring finger and the little finger. The user presses an upper portion of a trigger 30 with the index finger in order to cause the pneumatic tool to rotate in a first direction, and alternatively presses a lower portion of the trigger 30 with the middle finger in order to cause the pneumatic tool to rotate in a second direction opposite to the first direction.

However, there are problems with this conventional direction switch. To cause the pneumatic tool to rotate in the first direction, the user keeps on pressing the upper portion of the trigger 30 with the index finger while keeping the middle finger off the lower portion of the trigger 30. To cause the pneumatic tool to rotate in the second direction, the user keeps on pressing the lower portion of the trigger 30 with the middle finger while keeping the index finger off the upper portion of the trigger 30. The user soon has fatigue in the hand. The user might get hurt in the hand if using this pneumatic tool for long. Moreover, the user cannot hold the pneumatic tool steady with the middle finger, the ring finger and the little finger. In addition, the user may unintentionally change the direction of the rotation of the pneumatic tool, and this could dangerous. Furthermore, the elements are numerous, and the direction switch is complicated. The assembly, the maintenance and the repair of the direction switch are difficult. Moreover, in operation, only one pair of the intake 21 and the outlet 22 is used while the other pair of the intake 21 and the outlet 22 is idle, and this is a waste.

The present invention is therefore intended to obviate or at least alleviate the problems encountered in the prior art.

SUMMARY OF INVENTION

According to the present invention, a pneumatic tool is operable with a single hand. The pneumatic tool includes a shell defining a first chamber and a second chamber. The second chamber includes intake and outlet apertures in communication with the first chamber. A cylinder is in the first chamber. A controller is movable in the second chamber between a first position and a second position. The controller includes a first groove and a second groove. In the first position, the first groove communicates with the intake aperture for directing pressurized air to drive the cylinder in a first direction. In the second position, the second groove communicates with the intake aperture for directing pressurized air to drive the cylinder in a second direction. A cover seals the first chamber and the second chamber. The cover defines an opening through which the controller extends from the second chamber so that the controller can be moved.

The primary advantage of the pneumatic tool according to the present invention is the simple structure for the use of the simple controller including only the first and second grooves.

Other advantages and features of the present invention will become apparent from the following description referring to the attached drawings.

BRIEF DESCRIPTION OF DRAWINGS

The present invention will be described through detailed description of the preferred embodiment referring to the drawings.

DETAILED DESCRIPTION OF PREFERRED EMBODIMENT

Figure 1:
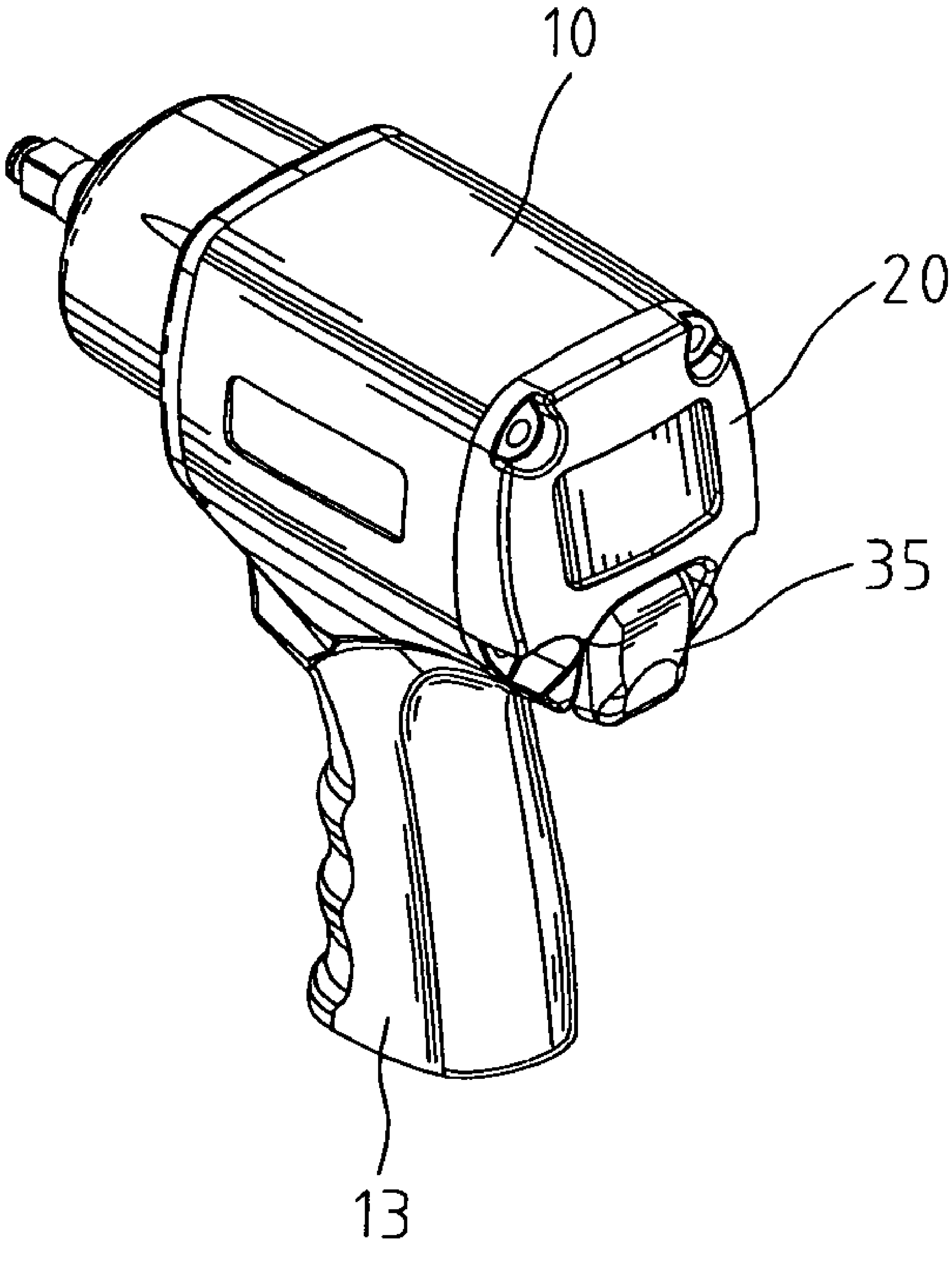
FIG. 1 is a perspective view of a pneumatic tool according to the preferred embodiment of the present invention.

Referring to FIG. 1, shown is a pneumatic tool according to the preferred embodiment of the present invention.

Figure 2:
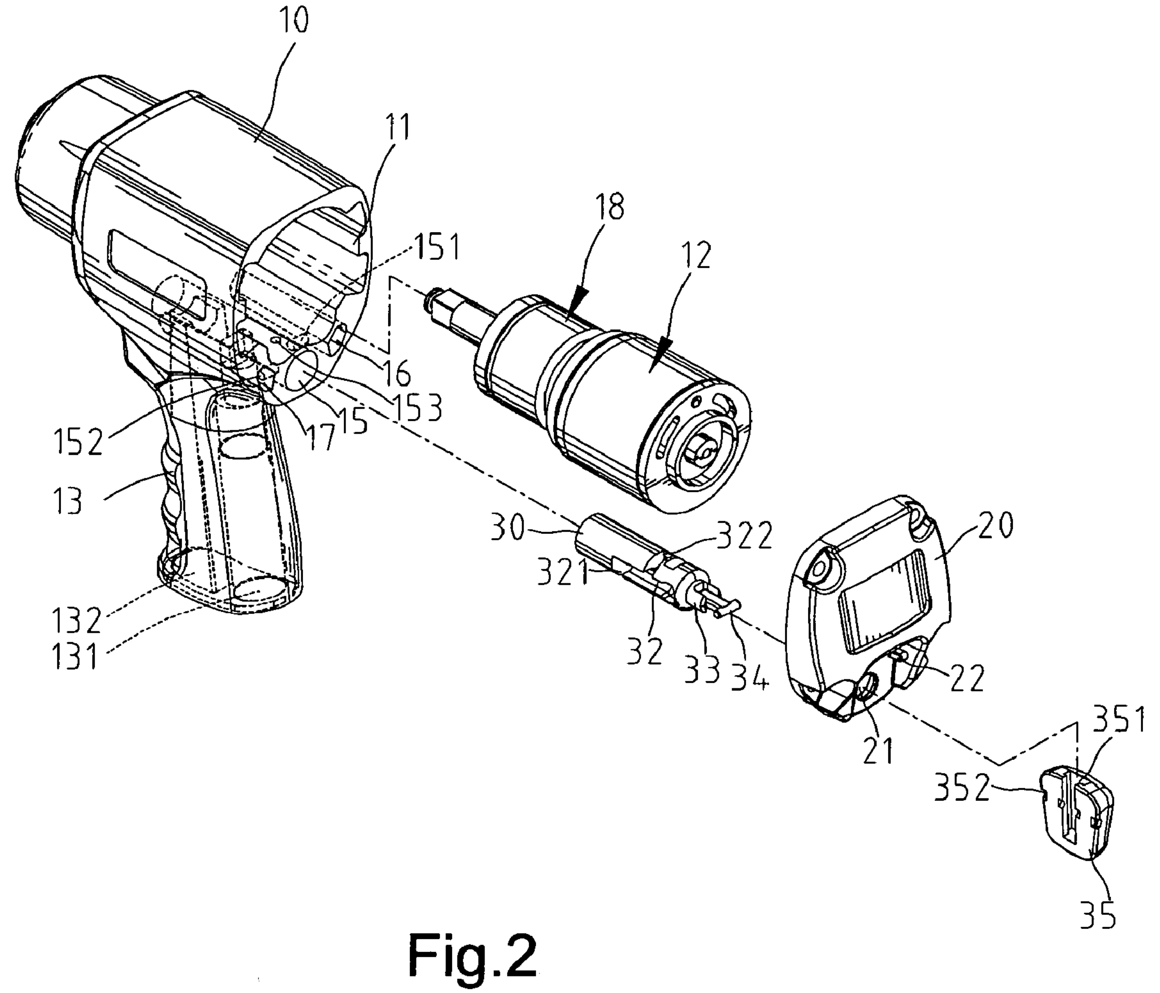
FIG. 2 is an exploded view of the pneumatic tool shown in FIG. 1.
Figure 3:
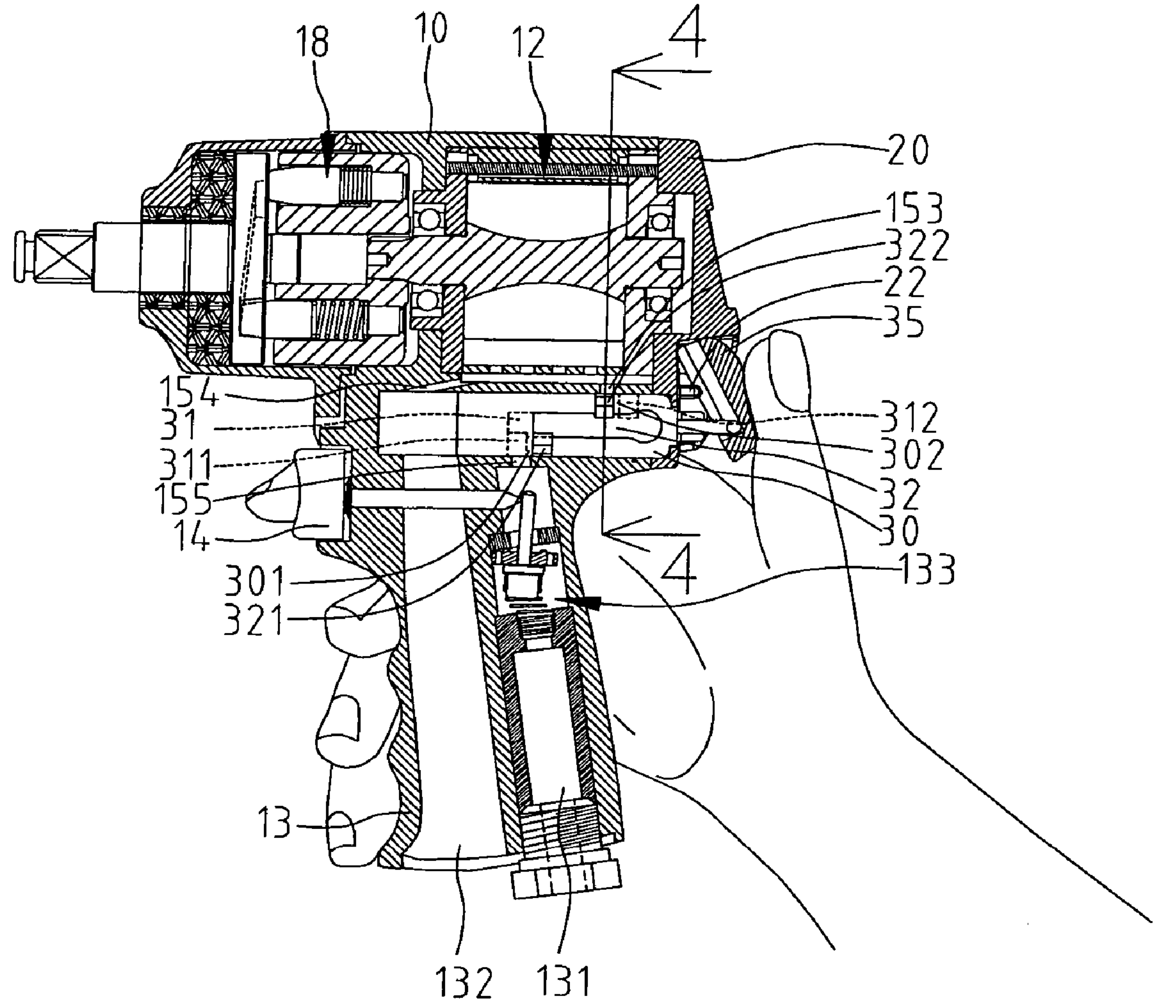
FIG. 3 is a cross-sectional view of the pneumatic tool shown in FIG. 1.
Figure 4:
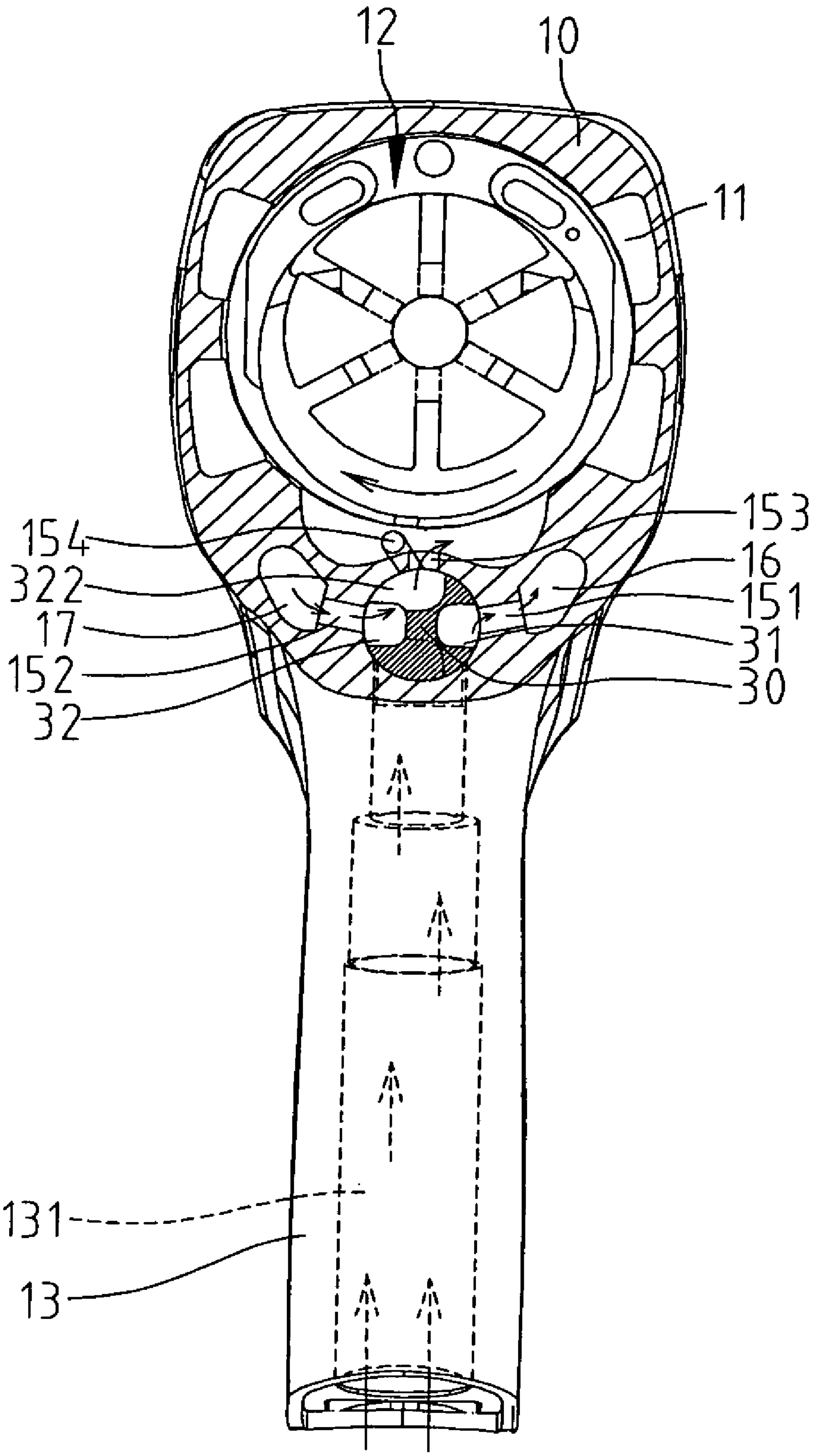
FIG. 4 is a cross-sectional view of the pneumatic tool along a line 4-4 in FIG. 3.

Referring to FIGS. 2 through 4, the pneumatic tool includes a shell 10 and a handle 13 projecting from the shell 10. The shell 10 defines a first chamber 11, a second chamber 15, a first channel 16 and a second channel 17. The first chamber 11 receives a cylinder 12 for driving a striker 18. The second chamber 15 receives a controller 30.

The handle 13 defines an intake 131 and an outlet 132. The intake 131 receives a valve 133 movable by a trigger 14 installed on the handle 13.

The second chamber 15 is in communication with the first channel 16 through an aperture 151 on a side. The second chamber 15 is in communication with the second channel 17 through an aperture 152 on another side. The second chamber 15 is in communication with the first chamber 11 through an intake aperture 153 near an end. Moreover, the second chamber 15 is in communication with the first chamber 11 through an outlet aperture 154 near an opposite end. The second chamber 15 is in communication with the intake 131 through an aperture 155.

The controller 30 can be switched between a first position and a second position. In the first position, the controller 30 causes the cylinder 12 to rotate in a first direction. In the second position, the controller 30 causes the cylinder to rotate in a second direction opposite to the first direction.

The controller 30 defines a first groove 31 on a side and a second groove 32 on an opposite side. The first groove 31 is separated from the second groove 32. The first groove 31 and the second groove 32 may be rectilinear, helical or S-shaped. The first groove 31 can be brought into communication with the first channel 16 through the aperture 151. The second groove 32 can be brought into communication with the second channel 17 through the aperture 152.

The first groove 31 includes a downward intake end 311 and an upward outlet end 312. The intake end 311 is spaced from the intake end 321 by a distance 301. The second groove 32 includes a downward intake end 321 and an upward outlet end 322. The outlet end 312 is spaced from the outlet end 322 by a distance 302. Along the length of the controller 30, the intake end 321 and the outlet end 322 of the second groove 32 are positioned between the intake end 311 and the upward outlet end 312 of the first groove 31.

In the preferred embodiment, the distance 301 is smaller than the diameter of the aperture 155 so that the controller 30 can be switched between two positions, i.e., the first and second positions. In another embodiment, the distance 301 may be larger than the diameter of the aperture 155 so that the controller 30 can be switched between three positions, i.e., a neutral position, a first working and a second working position. The relation between the distance 301 and the diameter of the aperture 155 is similar and will not be described in detail.

Attached to the shell 10 is a cover 20 for sealing the first chamber 11 and the channels 16 and 17. The cover 20 defines an opening 21 in communication with the second chamber 15. On an external side of the cover 20 are two pivots 22, with the opening 21 being between the two pivots 22. Although not shown for being conventional, the cover 20 defines two channels in communication with the channels 16 and 17, respectively. Thus, the pressurized air can flow between the cylinder 12 and the channels 16 and 17 through the channels on the internal side of the cover 20.

The controller 30 includes two ears 33 at an end. A T-shaped link 34 is connected to the ears 33. When the controller 30 is inserted in the second chamber 15 through the opening 21, the T-shaped link 34 is positioned outside. A lever 35 defines a T-shaped groove 351 and two recesses 352 on a side. The T-shaped groove 351 receives the T-shaped link 34 so that the lever 35 is connected to the T-shaped link 34. The recesses 352 receive the pivots 22 so that the lever 35 is installed on the pivots 22 like a seesaw. The lever 35 includes a first section on a side of the pivots 22 and a second section on another side of the pivots 22.

Referring to FIGS. 3 and 4, a user operates the pneumatic tool with a single hand. The user pushes down the first section of the lever 35 with the thumb, and then moves the thumb from the lever 35, leaving the first section of the lever 35 down. The controller 30 is in the first position. To turn on the pneumatic tool, the user operates the trigger 14 with the index finger. Now, the user holds the handle 13 and the trigger 14 steady with all of the thumb, the index finger, the middle finger, the ring finger and the little finger.

The pressurized air goes from the intake 131 into the intake end 311 of the first groove 31 through the aperture 155. The pressurized air leaves the outlet end 312 of the first groove 31 for the first channel 16 through the aperture 151. The pressurized air goes from the first channel 16 into an upper portion of the first chamber 11 through one of the channels of the cover 20. The pressurized air drives the cylinder 12 in the first direction. Then, the pressurized air leaves the upper portion of the first chamber 11 for the second channel 17 through the other channel of the cover 20. The pressurized air leaves the second channel 17 for the intake end 321 of the second groove 32 through the aperture 152. The pressurized air leaves the outlet end 322 of the second groove 32 for a lower portion of the first chamber 11. The pressurized air leaves the lower portion of the first chamber 11 for the outlet 132 through the outlet aperture 154. Finally, the pressurized air leaves the pneumatic tool from the outlet 132.

Figure 5:
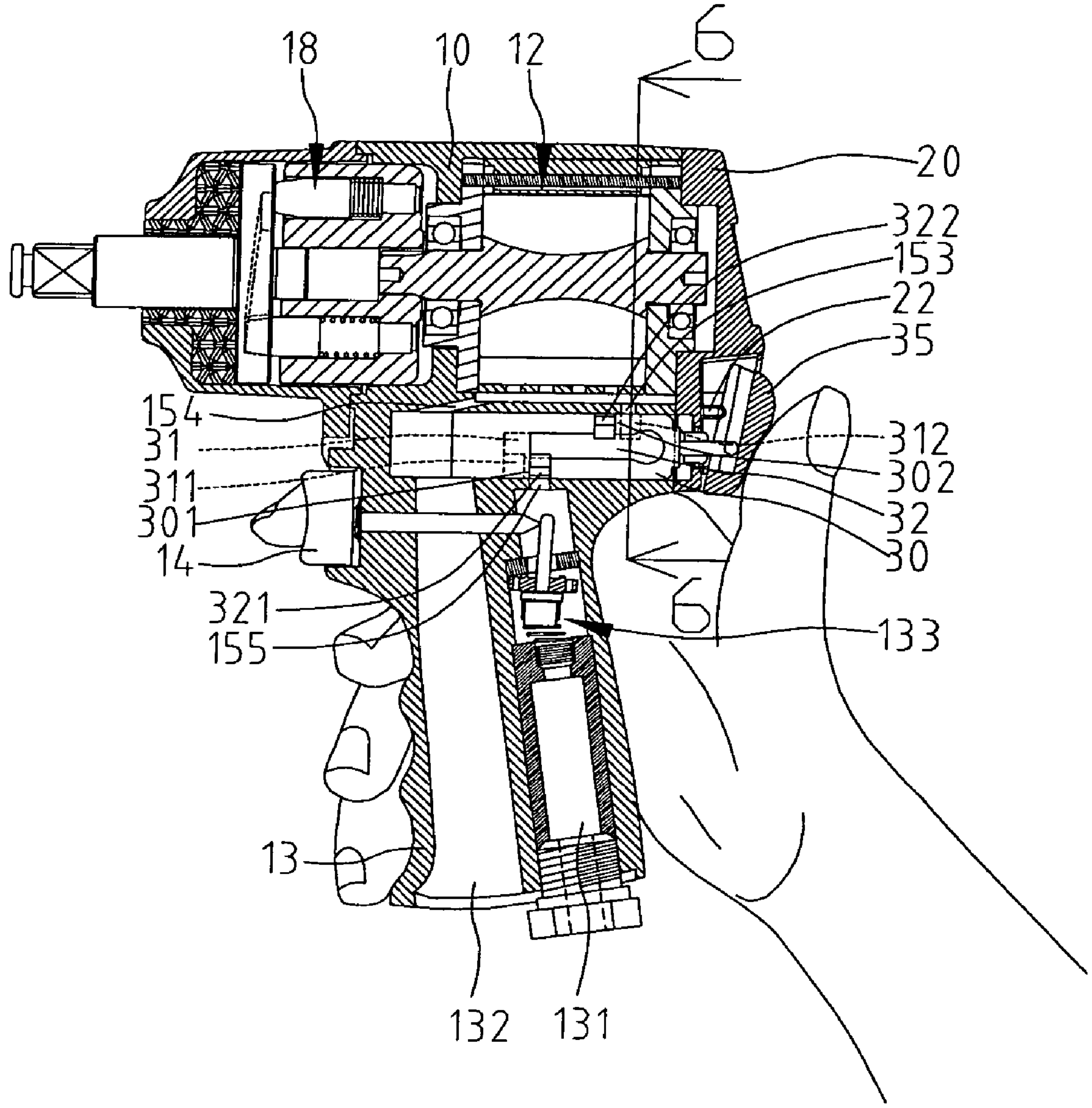
FIG. 5 is a cross-sectional view of the pneumatic tool in another position than shown in FIG. 1.
Figure 6:
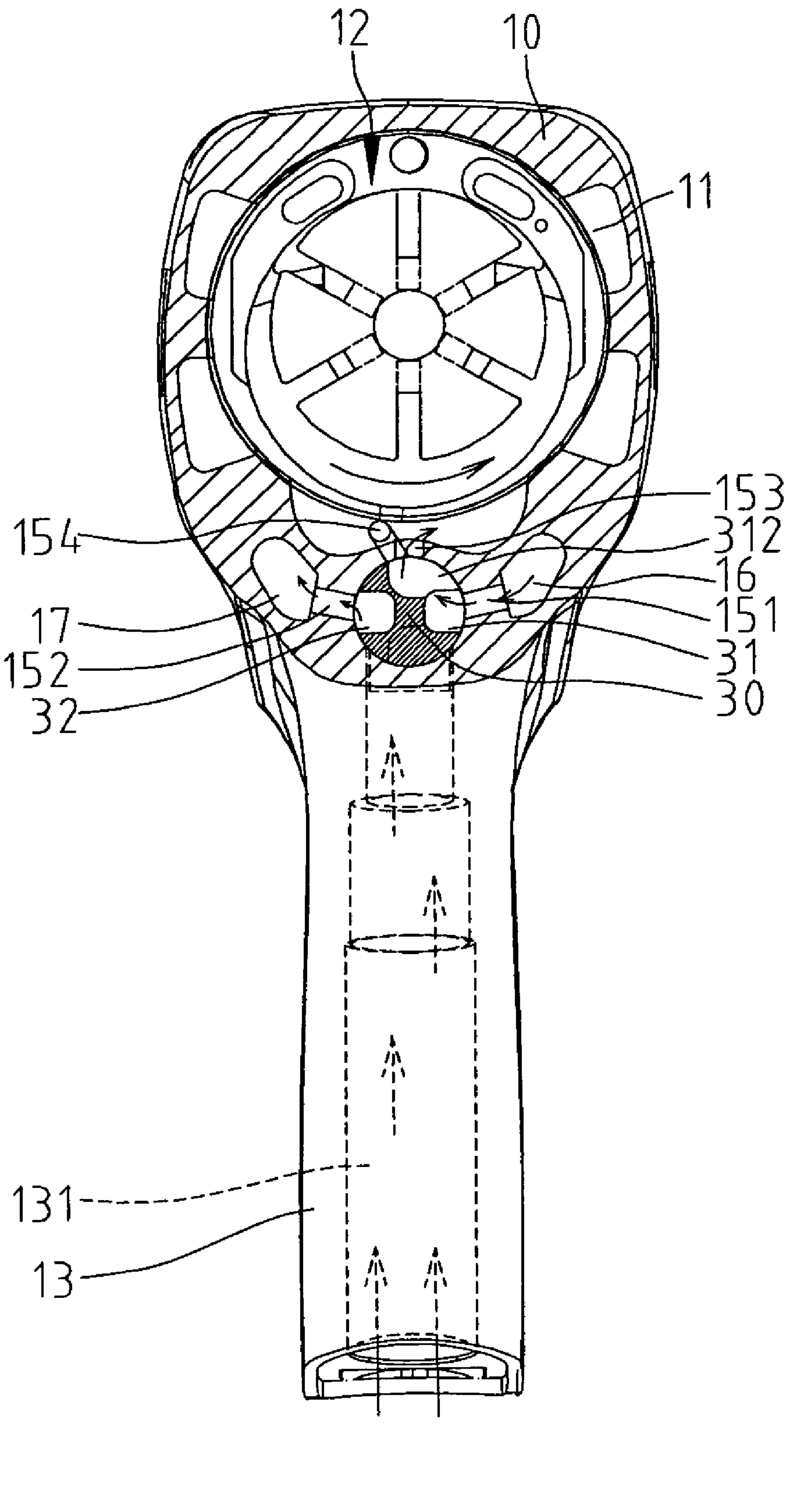
FIG. 6 is a cross-sectional view of the pneumatic tool along a line 6-6 in FIG. 5.
Figure 7:
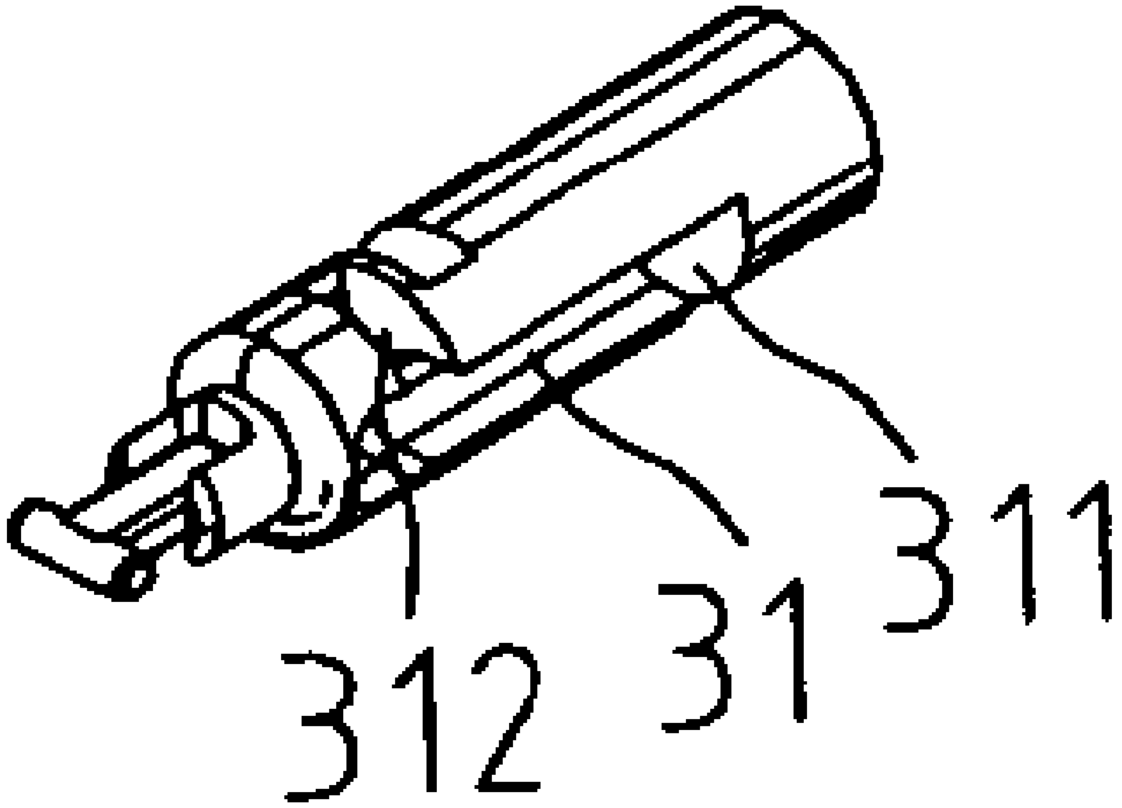
FIG. 7 is a perspective view of a controller used in the pneumatic tool shown in FIG. 2.

Referring to FIGS. 5 and 6, the user pushes down the second section of the lever 35 with the thumb, and then moves the thumb from the lever 35, leaving the second section of the lever 35 down. The controller 30 is in the second position. To turn on the pneumatic tool, the user operates the trigger 14 with the index finger.

The pressurized air goes from the intake 131 into the intake end 321 of the second groove 32 through the aperture 155. The pressurized air leaves the outlet end 322 of the second groove 32 for the second channel 17 through the aperture 152. The pressurized air leaves the second channel 17 for the upper portion of the first chamber 11 through one of the channels of the cover 20. The pressurized air drives the cylinder 12 in the second direction. Then, the pressurized air leaves the upper portion of the first chamber 11 for the first channel 16 through the other channel of the cover 20. The pressurized air leaves the first channel 16 for the intake end 311 of the first groove 31 through the aperture 151. The pressurized air leaves the outlet end 312 of the first groove 31 for the lower portion of the first chamber 11 through the intake aperture 153. The pressurized air leaves the lower portion of the first chamber 11 for the outlet 132 through the outlet aperture 154. Finally, the pressurized air leaves the pneumatic tool from the outlet 132.

The pneumatic tool according to the present invention exhibits several advantages. Firstly, the user holds the handle 13 and the trigger 14 steady with all of the thumb, the index finger, the middle finger, the ring finger and the little finger.

Secondly, to switch the cylinder 12 from one direction to another, the user operates the lever 35 with the thumb only. Having finished the switching, the user moves the thumb from the lever 35 to the handle 13. Thus, the user does not operate the lever 35 by mistake.

Thirdly, the structure of the pneumatic tool is simple for the use of the simple controller 30 including only the first groove 31 and the second groove 32.

The present invention has been described through the description of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A pneumatic tool operable with a single hand, with the pneumatic tool comprising:

a shell defining a first chamber and a second chamber, with the second chamber comprising an intake aperture in communication with a portion of the first chamber and an outlet aperture in communication with another portion of the first chamber;

a cylinder positioned in the first chamber;

a controller movable in the second chamber between a first position and a second position, wherein the controller comprises a first groove and a second groove so that in the first position, the first groove communicates with the intake aperture in order to direct pressurized air to drive the cylinder in a first direction, and that in the second position, the second groove communicates with the intake aperture in order to direct pressurized air to drive the cylinder in a second direction;

a cover for sealing the first chamber and the second chamber, with the cover defining an opening through which the controller extends from the second chamber so that the controller can be moved; and a lever connected to the controller and installed on the cover so that the lever is operable by the thumb between a first position corresponding to the first position of the controller and a second position corresponding to the second position of the controller, wherein the controller is moveable in an axial direction between the first and second positions, wherein the lever is pivotally installed on the cover about a pivot axis perpendicular to the axial direction, wherein the first and second grooves both comprise an intake end for communication with the intake aperture and an outlet end for communication with the outlet aperture, wherein the intake end of the first groove is spaced from the intake end of the second groove by a distance smaller than the diameter of the intake aperture of the second chamber, wherein the outlet end of the first groove is spaced from the outlet end of the second groove by a distance smaller than the diameter of the intake aperture of the second chamber.

2. The pneumatic tool according to claim 1 comprising a handle projecting from the shell and a trigger on the handle so that the trigger is operable by the index finger.

3. The pneumatic tool according to claim 1 wherein the first and second grooves are on two opposite sides of the controller.

4. The pneumatic tool according to claim 1 wherein along the controller, the intake and outlet ends of the second groove are located between the intake and outlet ends of the first groove.

5. The pneumatic tool according to claim 1 wherein the shell defines first and second channels for communicating the first chamber with the second chamber.

6. The pneumatic tool according to claim 1 comprising a link for connecting the controller to the lever.

7. The pneumatic tool according to claim 6 further comprising two ears on an end of the controller to which the link is pivotally connected.

8. The pneumatic tool according to claim 7 wherein the link is T-shaped, wherein the lever defines a T-shaped groove for receiving the T-shaped link.

9. A The pneumatic tool operable with a single hand, with the pneumatic tool comprising:

a shell defining a first chamber and a second chamber, with the second chamber comprising an intake aperture in communication with a portion of the first chamber and an outlet aperture in communication with another portion of the first chamber;

a cylinder positioned in the first chamber;

a controller movable in the second chamber between a first position and a second position, wherein the controller comprises a first groove and a second groove so that in the first position, the first groove communicates with the intake aperture in order to direct pressurized air to drive the cylinder in a first direction, and that in the second position, the second groove communicates with the intake aperture in order to direct pressurized air to drive the cylinder in a second direction;

a cover for sealing the first chamber and the second chamber, with the cover defining an opening through which the controller extends from the second chamber so that the controller can be moved; and a lever connected to the controller and installed on the cover so that the lever is operable by the thumb between a first position correspond to the first position of the controller and a second position corresponding to the second position of the controller, wherein the controller is moveable in an axial direction between the first and second positions, wherein the lever is pivotally installed on the cover about a pivot axis perpendicular to the axial direction, wherein the first and second grooves both comprise an intake end for communication with the intake aperture and an outlet end for communication with the outlet aperture, wherein the intake end of the first groove is spaced from the intake end of the second groove by a distance larger than the diameter of the intake aperture of the second chamber, wherein the outlet end of the first groove is spaced from the outlet end of the second groove by a distance smaller than the diameter of the intake aperture of the second chamber.

* * * * *